Patented Sept. 9, 1941

2,255,340

UNITED STATES PATENT OFFICE 2,255,340

BREAKFAST CEREAL

Florence Welch, Omaha, Nebr.

No Drawing. Application December 5, 1938,
Serial No. 244,034

2 Claims. (Cl. 99—81)

My invention relates to breakfast cereals, its primary object being the provision of a ready-to-serve cereal of a superior flavor.

Another of my objects is the preparation of a cereal by a very simple method requiring no complicated apparatus such as is necessary in making puffed cereals.

Another object of my invention is the provision of a breakfast food resembling puffed cereals but of superior flavor and requiring no special apparatus for its preparation.

Another object is the provision of a ready-to-serve cereal which may be mixed with raisins or other fruits either immediately before heating or at the time of packaging the preparation or at any other convenient time.

Another object which I have in view is the low cost preparation of a breakfast cereal so that the preparation may be marketed at a low cost.

In carrying out my invention, I prefer substantially the following formula:

| | | |
|---|---|---|
| Oatmeal | pounds | 125 |
| Water | pints | 3 |
| Salt (sodium chloride) | pound | ½ |
| Soda (sodium bicarbonate) | do | ½ |
| Eggs | do | 12 |
| Shortening | do | 50 |
| Brown sugar | do | 25 |

Mix thoroughly and bake slowly for thirty minutes at 350° F.

As is well known, oatmeal is composed largely of starch. The starch is in the form of minute grains which are only slightly soluble in water at room temperature. When subjected to heat in the presence of water, they swell up into a pasty mass, the starch grains being ruptured in the process. The presence of sodium bicarbonate increases the swelling action by more thoroughly rupturing the starch grains and by increasing the rapidity of action. The crystals of sodium chloride are disruptive when they give off their moisture while being heated and this materially assists in the disruption of the starch grains. The primary object, however, of the sodium bicarbonate is to remove the "raw" taste of the oatmeal.

My preferred shortening is one of vegetable origin but other shortenings may be substituted. Any edible animal fat or oil if of suitable flavor will give the desired results. Butter is an example of this in which a very agreeable flavor is imparted to the cereal since the heat to which it is subjected is not sufficiently great to break down the butter. Vegetable oils such as olive oil may be used. Even mineral oil may be employed without material change in function in the manufacture of my breakfast cereal, especially when the laxative effect of the mineral oil is desired.

The temperature to which the mixture is subjected is well below that required for changing the starch into dextrin or for breaking down the chemical constitution of the shortening. A slight increase in the baking temperature is permissible so long as the temperature does not rise to a point at which the change of the starch into dextrin occurs or at which the chemical composition of the shortening is affected.

The oatmeal may be of any desired cut. In fact, there are numerous equivalents for the oatmeal, these including practically all of the edible cereals in any desired cut or form; or whole wheat flour will give similar results except in the texture and flavor of the preparation.

The sugar merely serves to sweeten the preparation but the albumen of the eggs has a very important function in coating the particles of the cereals so that it will provide a coagulated coating for the particles to result in more violent and thorough rupture of the starch grains. It is found that the whole eggs including the yolks may be used to advantage since the yolks have food value of their own. The yolks are also rich in their vitamin A content.

The cereal as thus prepared may be employed in the same manner as that of any other ready-to-serve breakfast food. It may be eaten with or without cream or sugar, and it may be served either with or without cream or sugar, and it may be served either with or without raisins or other fruits. If desired, the preparation may be packaged with currants or raisins or any other fruits suitable for the purpose such as dried or evaporated apples or other fruits if suitably reduced in size.

Having thus described my invention in such full, clear, and exact terms that its composition and method of preparation will be readily understood by others skilled in the art to which it pertains, what I claim as new and desire to secure by Letters Patent of the United States is:

1. The process of preparing a puffed breakfast cereal which consists in impregnating particles of a starchy cereal with edible salts containing moisture, one of said salts being sodium bicarbonate for removing the "raw" taste of the cereal, the other of said salts being sodium chloride, coating said particles with albumen and an edible oil or fat to provide a coagulated coating for said particles, and then heating the mass to a temperature required for disrupting the starch grains but below the temperature required for converting the starch into dextrin, said salts serving to increase the puffing action of the cereal particles against said coagulated coating whereby thorough rupture of the particles is obtained.

2. The process of preparing a puffed breakfast cereal which consists in adding a solution of a half pound each of sodium chloride and sodium bicarbonate in three pints of water to one hundred twenty-five pounds of starchy cereal to impregnate the starch grains of the cereal and serving to give to said grains a swelling action, in adding thereto twelve pounds of eggs and fifty pounds of an edible fat or oil to give said grains a coagulated coating whereby the swelling action is resisted, in adding twenty-five pounds of sugar to sweeten the cereal, and then subjecting the mixture as specified to a slow heat of 350° F. for thirty minutes to cause the rupturing of the starch grains without converting the starch into dextrin, said salts in combination with said coating serving to put the swelling action under tension whereby a violent rupture of the grains is obtained when subjected to the specified temperature.

FLORENCE WELCH.